(12) United States Patent
Kunc et al.

(10) Patent No.: US 9,650,537 B2
(45) Date of Patent: May 16, 2017

(54) REACTIVE POLYMER FUSED DEPOSITION MANUFACTURING

(71) Applicant: UT-Battelle, LLC, Oak Ridge, TN (US)

(72) Inventors: Vlastimil Kunc, Concord, TN (US); Orlando Rios, Knoxville, TN (US); Lonnie J. Love, Knoxville, TN (US); Chad E. Duty, Loudon, TN (US); Alexander Johs, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 420 days.

(21) Appl. No.: 14/252,423

(22) Filed: Apr. 14, 2014

(65) Prior Publication Data

US 2015/0291833 A1 Oct. 15, 2015

(51) Int. Cl.
| | | |
|---|---|---|
| *B29C 71/02* | (2006.01) | |
| *B29C 71/04* | (2006.01) | |
| *C09D 163/00* | (2006.01) | |
| *B29C 67/00* | (2017.01) | |
| *B33Y 10/00* | (2015.01) | |
| *B33Y 80/00* | (2015.01) | |
| *B29L 9/00* | (2006.01) | |
| *B29K 101/00* | (2006.01) | |

(52) U.S. Cl.
CPC ........ *C09D 163/00* (2013.01); *B29C 67/0055* (2013.01); *B29C 67/0059* (2013.01); *B29C 67/0081* (2013.01); *B29K 2101/00* (2013.01); *B29L 2009/00* (2013.01); *B33Y 10/00* (2014.12); *B33Y 80/00* (2014.12)

(58) Field of Classification Search
CPC ............ B29C 67/0055; B29C 67/0059; B29C 67/0081; B29C 71/02; B29C 71/04
USPC .......................... 264/236, 308, 405, 464, 465
See application file for complete search history.

(56) References Cited

U.S. PATENT DOCUMENTS

| | | |
|---|---|---|
| 4,108,576 A | 8/1978 | Landfors |
| 5,378,879 A | 1/1995 | Monovoukas |
| | (Continued) | |

FOREIGN PATENT DOCUMENTS

| | | |
|---|---|---|
| CN | 202281269 U | 6/2012 |
| GB | 2 422 344 B | 7/2006 |
| | (Continued) | |

OTHER PUBLICATIONS

P. Yarlagadda et al., "An Innovative Technique for Rapid Product Development by Using Stereolithography Process and Microwave Radiation", Conference Paper, All India Machine Machine Tool Design and Research Conference, Dec. 2001, India.

(Continued)

*Primary Examiner* — Leo B Tentoni
(74) *Attorney, Agent, or Firm* — Pauley Erickson & Kottis

(57) ABSTRACT

Methods and compositions for additive manufacturing that include reactive or thermosetting polymers, such as urethanes and epoxies. The polymers are melted, partially cross-linked prior to the depositing, deposited to form a component object, solidified, and fully cross-linked. These polymers form networks of chemical bonds that span the deposited layers. Application of a directional electromagnetic field can be applied to aromatic polymers after deposition to align the polymers for improved bonding between the deposited layers.

19 Claims, 2 Drawing Sheets

(56) References Cited

U.S. PATENT DOCUMENTS

| | | | |
|---|---|---|---|
| 5,738,817 A | 4/1998 | Danforth et al. |
| 5,837,960 A | 11/1998 | Lewis et al. |
| 6,046,426 A | 4/2000 | Jeantette et al. |
| 6,122,564 A | 9/2000 | Koch et al. |
| 6,129,872 A | 10/2000 | Jang |
| 6,143,378 A | 11/2000 | Harwell et al. |
| 6,144,008 A | 11/2000 | Rabinovich |
| 6,165,406 A | 12/2000 | Jang et al. |
| 6,214,279 B1 | 4/2001 | Yang et al. |
| 6,344,160 B1 | 2/2002 | Holtzberg |
| 6,376,148 B1 | 4/2002 | Liu et al. |
| 6,401,001 B1 | 6/2002 | Jang et al. |
| 6,401,795 B1 | 6/2002 | Cesarano, III et al. |
| 6,405,095 B1 | 6/2002 | Jang et al. |
| 6,410,105 B1 | 6/2002 | Mazumder et al. |
| 6,423,926 B1 | 7/2002 | Kelly |
| 6,472,029 B1 | 10/2002 | Skszek |
| 6,476,122 B1 | 11/2002 | Leyden |
| 6,534,745 B1 | 3/2003 | Lowney |
| 6,641,772 B2 | 11/2003 | Gelbart |
| 6,706,234 B2 | 3/2004 | Huang |
| 6,730,252 B1 | 5/2004 | Teoh et al. |
| 6,793,140 B2 | 9/2004 | Mazumder |
| 6,830,643 B1 | 12/2004 | Hayes |
| 6,925,346 B1 | 8/2005 | Mazumder et al. |
| 6,934,600 B2 | 8/2005 | Jang et al. |
| 6,936,212 B1 * | 8/2005 | Crawford | B29C 67/0059 264/308 |
| 6,937,921 B1 | 8/2005 | Mazumder |
| 6,940,037 B1 | 9/2005 | Kovacevic et al. |
| 6,995,334 B1 | 2/2006 | Kovacevic et al. |
| 7,020,539 B1 | 3/2006 | Kovacevic et al. |
| 7,045,738 B1 | 5/2006 | Kovacevic et al. |
| 7,073,561 B1 | 7/2006 | Henn |
| 7,139,633 B2 | 11/2006 | Mazumder et al. |
| 7,286,893 B1 | 10/2007 | Mazumder |
| 7,291,002 B2 | 11/2007 | Russell et al. |
| 7,301,120 B2 | 11/2007 | Adams |
| 7,614,866 B2 | 11/2009 | Sperry et al. |
| 7,625,198 B2 | 12/2009 | Lipson et al. |
| 7,705,264 B2 | 4/2010 | Hoebel et al. |
| 7,741,578 B2 | 6/2010 | Adams et al. |
| 7,765,022 B2 | 7/2010 | Mazumder et al. |
| 7,827,883 B1 | 11/2010 | Cherng et al. |
| 7,836,572 B2 | 11/2010 | Mons et al. |
| 7,910,041 B1 | 3/2011 | Priedeman, Jr. |
| 7,939,003 B2 | 5/2011 | Bonassar et al. |
| 7,984,635 B2 | 7/2011 | Callebaut et al. |
| 8,062,715 B2 | 11/2011 | Skszek et al. |
| 8,177,348 B2 | 5/2012 | Sidhu et al. |
| 8,383,028 B2 | 2/2013 | Lyons |
| 8,419,996 B2 | 4/2013 | Swanson et al. |
| 2002/0017743 A1 | 2/2002 | Priedeman, Jr. |
| 2002/0062909 A1 | 5/2002 | Jang et al. |
| 2002/0065573 A1 | 5/2002 | Mazumder et al. |
| 2002/0110649 A1 | 8/2002 | Skszek et al. |
| 2002/0111707 A1 | 8/2002 | Li et al. |
| 2002/0113331 A1 | 8/2002 | Zhang et al. |
| 2002/0142107 A1 | 10/2002 | Mazumder et al. |
| 2002/0145213 A1 | 10/2002 | Liu et al. |
| 2002/0165634 A1 | 11/2002 | Skszek |
| 2003/0006534 A1 | 1/2003 | Taboas et al. |
| 2003/0083771 A1 * | 5/2003 | Schmidt | B29C 67/0059 700/119 |
| 2004/0060639 A1 | 4/2004 | White |
| 2004/0151978 A1 | 8/2004 | Huang |
| 2005/0080191 A1 | 4/2005 | Kramer et al. |
| 2005/0116391 A1 | 6/2005 | Lindemann et al. |
| 2005/0121112 A1 | 6/2005 | Mazumder et al. |
| 2005/0280185 A1 | 12/2005 | Russell et al. |
| 2005/0288813 A1 | 12/2005 | Yang et al. |
| 2007/0036964 A1 | 2/2007 | Rosenberger et al. |
| 2007/0241482 A1 * | 10/2007 | Giller | B29C 67/0066 264/494 |
| 2008/0042321 A1 | 2/2008 | Russell et al. |
| 2009/0014439 A1 | 1/2009 | Kim |
| 2009/0026175 A1 | 1/2009 | Adams |
| 2009/0101278 A1 | 4/2009 | Laberge-Lebel et al. |
| 2009/0104386 A1 | 4/2009 | Barrera et al. |
| 2009/0200275 A1 | 8/2009 | Twelves, Jr. et al. |
| 2010/0034982 A1 | 2/2010 | Fuwa |
| 2010/0125356 A1 | 5/2010 | Shkolnick et al. |
| 2010/0143668 A1 | 6/2010 | Farmer et al. |
| 2011/0076496 A1 | 3/2011 | Batchelder et al. |
| 2011/0203937 A1 | 8/2011 | Sidhu |
| 2011/0293840 A1 | 12/2011 | Newkirk et al. |
| 2011/0305590 A1 | 12/2011 | Wescott et al. |
| 2012/0033002 A1 | 2/2012 | Seeler et al. |
| 2012/0088023 A1 | 4/2012 | Begun |
| 2012/0159785 A1 | 6/2012 | Pyles et al. |
| 2012/0161350 A1 | 6/2012 | Swanson et al. |
| 2012/0162305 A1 | 6/2012 | Swanson et al. |
| 2012/0164256 A1 | 6/2012 | Swanson et al. |
| 2012/0164330 A1 | 6/2012 | Swanson et al. |
| 2012/0201960 A1 | 8/2012 | Hartmann et al. |
| 2012/0219726 A1 | 8/2012 | Bayer et al. |
| 2012/0289657 A1 | 11/2012 | Hilf et al. |
| 2013/0000549 A1 | 1/2013 | Hartmann |
| 2013/0015596 A1 | 1/2013 | Moxeika et al. |
| 2013/0034633 A1 | 2/2013 | Von Hasseln |
| 2013/0089642 A1 | 4/2013 | Lipson et al. |
| 2013/0101728 A1 | 4/2013 | Keremes et al. |
| 2013/0101729 A1 | 4/2013 | Keremes et al. |
| 2013/0255216 A1 | 10/2013 | Argyropoulos |
| 2014/0093932 A1 * | 4/2014 | Murphy | B29C 67/0059 435/173.4 |
| 2015/0165666 A1 | 6/2015 | Butcher et al. |
| 2015/0183138 A1 | 7/2015 | Duty et al. |
| 2015/0183159 A1 | 7/2015 | Duty et al. |
| 2015/0183164 A1 | 7/2015 | Duty et al. |
| 2016/0151939 A1 * | 6/2016 | Kisailus | B29C 33/3857 264/405 |

FOREIGN PATENT DOCUMENTS

| | | |
|---|---|---|
| JP | 57-192202 | 11/1982 |
| WO | WO 2012/072513 A2 | 6/2012 |
| WO | WO 2012/073089 A1 | 6/2012 |

OTHER PUBLICATIONS

L.-H. Zhang et al., "Priciple and Feasibility of Electric or Magnetic Field Deflection-Projection Based Rapid Prototyping Technique", Trans. of Tianjin Univ., Mar. 2003, v. 9 pp. 41-44.

Moon, J.W., et al., "Microbial formation of lanthanide-substituted magnetites by Thermoanaerobacter sp. TOR-39," Extremophiles, vol. 11 (2007) pp. 859-867.

Vega, E.J., et al., "A novel technique to produce metallic microdrops for additive manufacturing," Int. J Adv Manuf Technol, (2014), vol. 70, pp. 1395-1402.

Co-pending U.S. Appl. No. 15/348,366, filed Nov. 10, 2016; Inventors: Chad E. Duty et al., title: Large Scale Room Temperature Polymer Advanced Manufacturing.

\* cited by examiner

REACTIVE POLYMER FUSED DEPOSITION MANUFACTURING

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to additive or fused deposition manufacturing, and more particularly to use of reactive polymers, for additive or fused deposition manufacturing.

BACKGROUND OF THE INVENTION

Additive manufacturing may be used to quickly and efficiently manufacture complex three-dimensional components layer-by-layer. Such additive manufacturing may be accomplished using polymers, alloys, powders, wires, or similar feed stock materials that transition from a liquid or granular state to a cured, solid component.

Polymer-based additive manufacturing is presently accomplished by several technologies that rely on feeding polymer materials through a nozzle that is precisely located over a preheated polymer substrate. Parts are manufactured by the deposition of new layers of materials above the previously deposited layers. Unlike rapid prototyping processes, additive manufacturing is intended to produce a functional component constructed with materials that have strength and properties relevant to engineering applications. On the contrary, rapid prototyping processes typically produce exemplary models that are not production ready.

Large scale polymer extrusion based additive manufacturing of mechanically robust components requires localized heating and large thermal gradients that cause all conventional materials designed for 3D printing to fail due to large macroscopic distortions. The problem is compounded by low adhesion between deposition layers resulting in delamination of adjacent layers and low overall z-strength. The complexity, cost and flexibility of large scale additive manufacturing is greatly reduced by building components out of the oven, therefore there is a strong motivation to make this transition. State-of-the-art as well as low-cost polymer materials for additive manufacturing are not fully compatible with out of the oven printing. Thus, there is a continuing need for improved additive manufacturing materials and methods.

SUMMARY OF THE INVENTION

The additive manufacturing industry in general is moving away from making non-functional models also known as trinkets and driving toward 3D printing of functional components that require properties comparable to engineering materials such as aluminum. When building with polymers the mechanical strength of a thermoplastic typically increases with the molecular weight and the degree of branching of side chains. Unfortunately this also results in an elevation of the melt viscosity and melting point. Fused deposition manufacturing (FDM) requires that a layer maintains tolerance immediately after deposition along with a structural bond to subsequent layers. This structural bond is formed by physically pushing the polymer melt into the previous layer. Therefore the resistance to melt flow is an important parameter and the extrusion of high strength thermoplastics requires elevated temperatures that aggravate thermal distortion. This invention circumvents these limitations by making use of cross-linking hybrid polymers that act both as thermoplastics and thermosets. These polymers can be melt processed and readily form networks of chemical bonds that span z-layers, significantly increasing bonding between deposition layers and z-strength.

Traditional additive manufacturing and/or FDM relies on thermoplastics. This invention provides additive manufacturing with reactive or hybrid polymers, specifically with polymers which can be deposited and fused in place as thermoplastics and subsequently cross-linked. The invention includes depositing hybrid polymers, which simultaneously exhibit rheological properties typically associated with thermoplastics and extensive chemical cross-linking typically associated with thermosets, in order to directly build layered structures into components with low distortion and chemical or chemical/physical bonds across z-layers. The polymers can be deposited via extrusion methods similar to well established thermoplastic additive manufacturing in a form with adequate viscosity.

In conventional FDM the polymer feed material is simply melted and extruded directly onto a cold or warm plate, or prior build layer. These applications require materials that are spatially locked in place immediately after deposition and maintain tolerance during thermal cycling. Since out-of-the-box heating requires localized deposition of energy to promote layer to layer bonding, part distortion is a limiting factor when building high strength components. This invention incorporates multi-component reactive polymers that exhibit a broad thermal activation window facilitating rapid prepolymer formation at slightly elevated temperatures without fully cross-linking. The polymer working material will be prepared from reactive polymers, such as polyurethane and/or epoxy, with rapid and latent cross-linking agents, such as moisture provided by a humid environment in the case of urethanes, or an aromatic amine and a polyphenol for epoxies. Typical FDM employs a three step process, namely, melt, deposit and solidify, while embodiments of this invention can include a five step process: melt, partially cross-link to achieve desired viscosity, deposit, solidify and initiate extensive cross-linking. In other embodiments application of an electromagnetic field can be also or additionally used to align aromatic polymer structures for cross-linking between layers. The formation of chemical bonds across layers will improve z-strength and enable incorporation of a large fraction of second phase reinforcements such as carbon fiber both of which are currently limited in polymer 3D printing.

Other objects and advantages will be apparent to those skilled in the art from the following detailed description taken in conjunction with the appended claims and drawings.

DETAILED DESCRIPTION OF THE INVENTION

The present invention provides materials and processes for additive manufacturing and/or FDM with cross-linkable polymers. The method and materials of this invention address limitations discussed above with a materials and processing solution using reactive polymers, such as epoxies and polyurethanes. This method and materials of this invention enable rapid out-of-the-box printing with minimal part distortion and enhanced cross-layer bonding.

Figure 1:
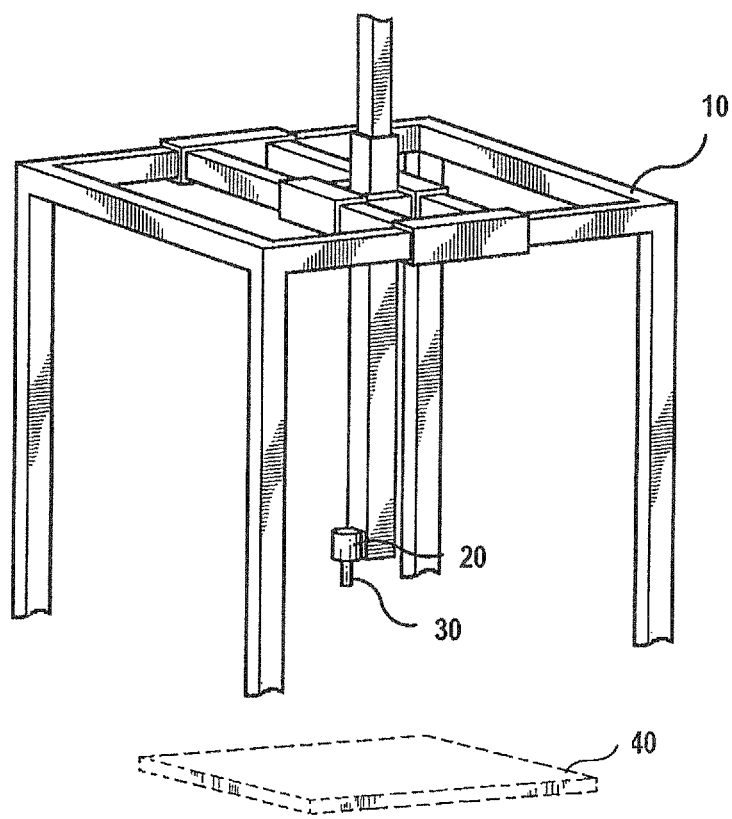
FIG. 1 is a partial schematic of a conventional polymer extrusion system for additive manufacturing.

FIG. 1 shows a portion of a conventional polymer extrusion system 10, such as that feeds a polymer material into a liquefier to extrude a melted, liquefied polymer material. As shown the polymer extrusion system 10 uses a moveable print head 20 with a nozzle 30, positioned with respect to a work surface (not shown) to create a desired work piece, component, or part 40. The nozzle 30 can be any suitable nozzle, and desirably provides a sufficient throughput of low viscosity material, such as at a low process pressure (e.g., ≤about 100 psi) and/or low process temperatures (e.g., ≤about 150° C.).

In one embodiment of this invention, a process for manufacturing a component using additive manufacturing includes the steps of melting a supply of polymer material, depositing the polymer material in the melted form to form the component, and cross-linking the working material within the component. The use of cross-linkable or thermoset materials in the method of this invention provides an advantage of chemically bonding (cross-linking) with underlying, or previously deposited, layers to improve inter-layer adhesion and strength of the deposited part. The three dimensionality of the bonding and solidification process will also reduce the directional bias of material properties and provide isotropic properties.

Figure 2:
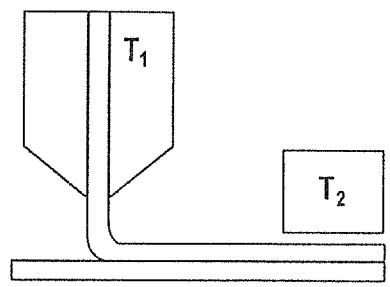
FIG. 2 representatively illustrates an extrusion of a polymer material according to one embodiment of this invention.
Figure 3:
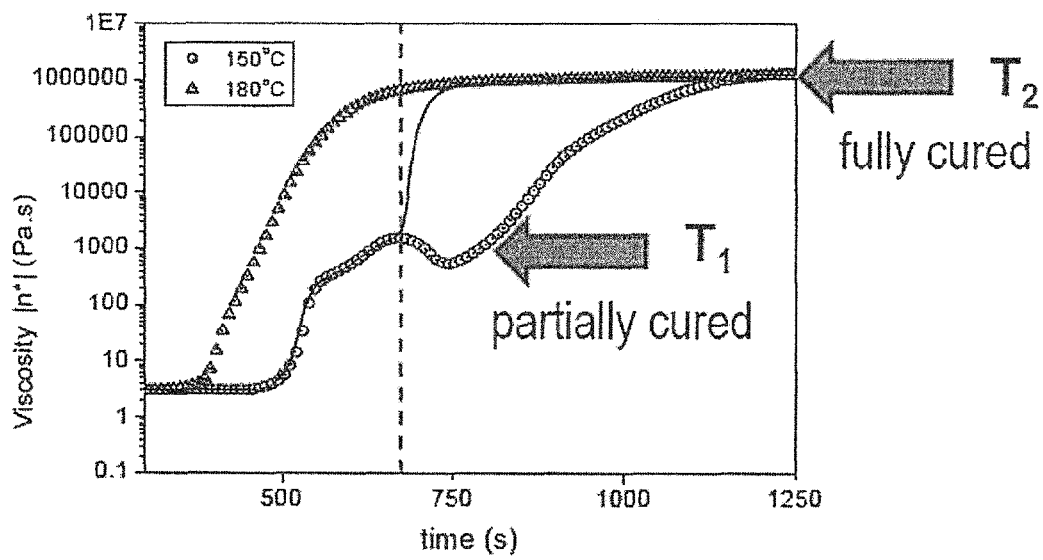
FIG. 3 representatively illustrates curing profiles of a polymer material, and the impact of curing temperature over time, according to one embodiment of this invention.

In one embodiment of this invention, such as shown in FIG. 2, the method begins with a supply of polymer working material, such as in a liquid, granulated or pelletized state. The polymer material can include any suitable additives, such as cross-linking agents. The polymer material is melted, if needed, and partially cross-linked prior to depositing, such as at time or temperature (e.g., about 100-150°) $T_1$. The melted polymer material is deposited layer by layer, such as using known and conventional deposition techniques and equipment, to form the intended component. The polymer material is solidified upon deposition, such as at room temperature and/or with reaction to air, and then the solidified polymer material is additionally cross-linked, such as at time or temperature $T_2$ by a downstream curing element, to obtain the intended, final cross-linking within the component. The last cross-linking step desirably forms chemical bonds across the plurality of deposited layers in the z-direction. FIG. 3 generally and representatively illustrates exemplary curing profiles of a thermally activated hybrid polymer, namely a liquid crystalline epoxy resin material, and the impact of curing temperature, according to one embodiment of this invention.

Using thermoset materials according to this invention can minimize distortion during a build, increase layer-to-layer adhesion, and/or minimize anisotropy in the part that results from poor interlayer adhesion. The traditional thermoplastic approach with FDM relies on the molten extruded material to solidify on top of a previous deposit, which is typically held at an elevated temperature, but well below the melting temperature of the material. In this condition, the interaction between the newly extruded material and previous deposit is minimal—as there is very little penetration and entanglement of molecules from the molten material into the previous deposit. Even when the previous deposit is held at an elevated temperature, the surface may become "tacky", but the intermolecular bonding between the deposition layers remains low.

With the reactive, thermoset materials and method according to this invention, the solidification process is a chemically driven polymerization process, rather than solely a thermally driven phase change as with thermoplastics. This invention takes advantage of unique rheological characteristics of hybrid polymers for additive manufacturing. As used herein, "hybrid polymers" are polymers that are both thermoplastic and thermosetting. These materials are solid at room temperature and melt at elevated temperatures, yet can cross-link to form a thermoset. In embodiments of this invention, these polymers act like thermoplastics during deposition, and like thermosets after deposition. During the deposition of thermosets, a monomer material is deposited in liquid form. The cross-linking process that solidifies the thermoset material is irreversible and may be driven by time, heat, a chemical reaction, and/or irradiation. In the case of additive manufacturing according to embodiments of this invention, the concept is to cross-link the material using a chemical reaction and maintain a low temperature gradient within the part. The catalyst that initiates the cross-linking process may either be a secondary chemical mixed with the deposited material during or just prior to deposition, or the cross-linking may be initiated with exposure to air.

Exemplary polymers according to this invention include polyurethanes and epoxies. In embodiments of this invention, the polymer material will be prepared with a rapid cross-linking agent and/or a latent cross-linking agent, such as moisture provided by a humid environment in the case of urethanes, or an aromatic amine and/or a polyphenol for epoxies. The polymer can be blended with a limited quantity of one curing agent to obtain a partially reacted prepolymer at moderate temperatures, such as during melt extrusion, and a second less reactive curing agent, such as a phenolic curing agent, for high temperature curing.

In one embodiment of this invention, the viscosity of the polymer material, in the melted form, is adjusted for deposition. In one embodiment, the polymer material can be partially cross-linked prior to depositing and additionally or fully cross-linked after depositing and solidifying. As one example, urethanes can be deposited in linearized gel form at elevated temperature and subsequently cross-linked when the material is in place. Depositing in a gel form at an elevated temperature allows fusion between layers, while subsequent cross linking forms strong bond between the layers. The viscosity of the polymer at deposition can be controlled not only via temperature variation (such as for thermoplastics), but also through polymer chain length and/or via addition of reinforcements such as carbon, glass or aramid fibers. This makes additive manufacturing and/or FDM more feasible for deposition of fiber reinforced materials, since the apparent viscosity can be reduced by using polymers in low viscosity states. Additionally, the cross-linking reaction enhances chemical adhesion between the polymer and fiber reinforcement, which increases achievable mechanical properties of the resulting part.

In embodiments of this invention, the supply of the working polymer material comprises a reinforcement fiber. Compounding with other reinforcing agents, such as glass or carbon fibers, is desired or required to achieve performance that is competitive with conventional engineering materials. In the case of materials containing carbon fibers (or other fibrous materials), there is the potential to shear align the fibers during the extrusion process and define the orientation of the fibers (and thus the mechanical strength) throughout the three dimensional part. Although ongoing studies have already shown significant increases in mechanical properties in the build plane, an inherent limitation associated with the incorporation of such reinforcing agents into thermoplastics is a substantial decrease in z-strength resulting from additional resistance to flow. Unfortunately, the reinforcing agent distributions that most effectively increase strength also increase the viscosity of the polymer melt. The typical engineering solution is to compromise strength by reducing the ideal fraction and distribution of reinforcing agents in order to attain manageable rheological properties or add plasticizers that further weaken the polymer. Reactive polymers can circumvent this limitation by reducing resistance to flow, while forming strong chemical bonds across layers (in the z-direction) after curing.

In other embodiments of this invention, the chemical bonding across layers can be obtained and/or enhanced by applying a directional electromagnetic field to the deposited polymer working material. In these embodiments, the method controls the crystalline domains of the polymer materials using directional electromagnetic fields to create strong covalent bonding between and/or across layers.

Figure 4:
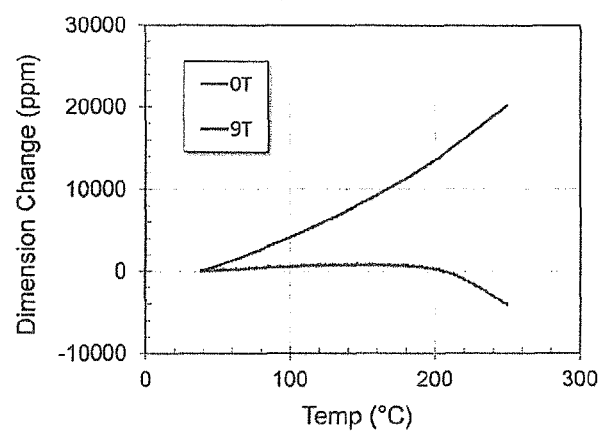
FIG. 4 is a graph generally illustrating a representative deformation profile of a zero-CTE epoxy polymer after curing in a magnetic field.

Desirably, the directional electromagnetic field is applied to the deposited polymer material before or during cross-linking, such as after partial or full deposition of the component. The polymer is desirably an aromatic polymer having a low coefficient of thermal expansion (CTE). An exemplary polymer is a liquid crystalline aromatic epoxy that is responsive to electromagnetic energy. For example, in one embodiment, a magnetic field directed perpendicular to the plane of an aromatic system induces a ring current in the delocalized π electrons of the polymer. The ring current results in reorientation of the aromatic system parallel to the magnetic field. Thus it is possible to align and cure aromatic epoxy compounds in an oriented nematic or smectic phase by applying a static magnetic field. Recent investigations have shown that synthetic liquid crystalline epoxies cured under a high magnetic field exhibit a slightly negative glassy CTE, such as representatively shown in FIG. 4. These bulk properties are directly related to the long range ordering of crystalline domains essentially forming a texture that aligns with the magnetic field lines.

In one embodiment of this invention, the polymer material includes one or more multi-component epoxy polymers with a broad thermal activation window facilitating a rapid prepolymer formation at slightly elevated temperatures without fully cross-linking the epoxy. The polymer can be prepared from an epoxy blend with rapid and/or latent cross-linking agents, such as an aromatic amine and/or a polyphenol. The prepolymer is then processed into extrusion-ready pellets, which can be supplied into an FDM or other deposition system. Localized electromagnetic energy (AC field heating, microwave heating, IR lamp etc.) applied to the deposited polymer aligns the liquid crystalline domains and desirably fully cures the formed material. The wide thermal activation window initially immobilizes the polymer material, while allowing electromagnetic control during the development of the inherent microstructure followed by thermal curing.

Exemplary commercial epoxy precursors include aromatic epoxies (e.g., epoxy bisphenol A) or aromatic/aliphatic epoxies. For the latter, the aromaticity enhances the microstructure development under magnetic fields while the aliphatic segments lower the viscosity of the epoxy to enhance the processability. The epoxy can be blended with a limited quantity of an aromatic amine curing agent to obtain a partially reacted prepolymer at moderate temperatures (near room temperature) and a second less reactive phenolic curing agent for high temperature curing. This strategy results in a broad thermal activation range allowing extrusion and deposition at lower temperatures and final curing at higher temperatures. The aromaticity of both epoxy and curing agent, as well as functional groups, e.g., the ratio of primary amine and hydroxyl groups, can be tuned for the desired extrudability and subsequent high temperature curing. Incorporation of aromatic segments without sacrificing extrudability and while maintaining the capability to rapidly cure at high temperature under a magnetic field is an important concept for zero-CTE composites according to this invention. After deposition, electromagnetic processing will allow development of a crystalline microstructure and curing by controlled localized heating. The ratio between the epoxy, rapid and latent curatives to obtain optimal conditions for the microstructure development in the magnetic field can be specifically tailored as needed for FDM procedures.

Thus the invention provides materials and methods for additive manufacturing components with additional chemical bonding between deposited layers. The hybrid polymers allow for use within existing deposition systems, while enabling rapid out-of-the-box printing with minimal part distortion and enhanced cross-layer bonding.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A process for manufacturing a component using additive manufacturing comprising the steps of:
   melting a supply of polymer material;
   adjusting the viscosity of the polymer material in the melted form for deposition by partially cross-linking the melted polymer material prior to the depositing;
   depositing the polymer material in the melted form in a plurality of layers to form the component;
   solidifying the deposited polymer material; and
   additionally cross-linking the working material within the component to form chemical bonds across the plurality of layers.

2. The process according to claim 1, wherein the polymer material includes a rapid cross-linking agent and a latent cross-linking agent.

3. The process according to claim 1, further comprising applying a directional electromagnetic field to the deposited polymer material during the solidifying and/or the additional cross-linking.

4. The process according to claim 1, wherein the polymer material comprises a hybrid polymer.

5. The process according to claim 1, wherein the polymer material comprises a urethane and/or an epoxy.

6. The process according to claim 1, wherein the polymer material comprises a liquid crystalline aromatic epoxy.

7. The process according to claim 1, wherein the polymer material comprises a urethane partially cross-linked to and deposited in a linearized gel form.

8. The process according to claim 1, wherein the polymer material comprises a reinforcement fiber.

9. The process according to claim 1, further comprising aligning and curing the polymer material in an oriented nematic or smectic phase by applying a static magnetic field.

10. The process according to claim 1, wherein the supply of working material comprises a granulated or pelletized state.

11. The process according to claim 1, wherein the polymer material includes first cross-linking agent to obtain the partial cross-linking and a different second cross-linking agent to obtain the additional cross-linking.

12. A process for manufacturing a component using additive manufacturing comprising the steps of:
    melting a supply of polymer material;
    depositing layers of the polymer material in the melted form to form the component;
    cross-linking the working material within the component to form chemical bonds across the layers; and
    applying a directional electromagnetic field to the deposited polymer material before or during cross-linking to align polymer structures for the cross-linking across the layers.

13. The process according to claim 12, further comprising solidifying the deposited layers before cross-linking and applying the directional electromagnetic during the solidifying.

14. The process according to claim 12, wherein the directional electromagnetic field controls crystalline domains of the polymer material.

15. The process according to claim 12, wherein the directional electromagnetic field is directed perpendicular to a plane of an aromatic system of the polymer material and induces a ring current in the delocalized electrons of the polymer material and reorientation of the aromatic system parallel to the magnetic field.

16. The process according to claim 12, wherein the polymer material comprises a hybrid polymer that is solid at room temperature, melts at elevated temperatures above room temperature, and cross-links to form a thermoset.

17. The process according to claim 12, wherein the polymer material comprises a urethane and/or an epoxy.

18. The process according to claim 12, further comprising aligning and curing the polymer material in an oriented nematic or smectic phase by applying a static magnetic field.

19. The process according to claim 12, wherein the polymer material comprises a liquid crystalline aromatic epoxy.

* * * * *